US011218923B2

(12) United States Patent
Desai et al.

(10) Patent No.: US 11,218,923 B2
(45) Date of Patent: Jan. 4, 2022

(54) DEVICE AWARE SELECTIVE ROAMING FOR MOBILE DEVICES

(71) Applicant: Cisco Technology, Inc., San Jose, CA (US)

(72) Inventors: Vishal S. Desai, San Jose, CA (US); Jerome Henry, Pittsboro, NC (US); Amir H. Kamalizad, Menlo Park, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/659,180

(22) Filed: Oct. 21, 2019

(65) Prior Publication Data
US 2020/0092765 A1 Mar. 19, 2020

Related U.S. Application Data

(63) Continuation of application No. 16/136,098, filed on Sep. 19, 2018, now Pat. No. 10,455,462.

(51) Int. Cl.
| | |
|---|---|
| *H04W 36/00* | (2009.01) |
| *H04L 5/00* | (2006.01) |
| *H04W 56/00* | (2009.01) |
| *H04W 76/12* | (2018.01) |
| *H04W 36/14* | (2009.01) |

(Continued)

(52) U.S. Cl.
CPC ....... *H04W 36/0066* (2013.01); *H04L 5/0048* (2013.01); *H04W 16/14* (2013.01); *H04W 36/14* (2013.01); *H04W 48/16* (2013.01); *H04W 48/18* (2013.01); *H04W 56/001* (2013.01);

(Continued)

(58) Field of Classification Search
CPC .......... H04W 36/0066; H04W 56/001; H04W 76/12; H04W 36/14; H04W 48/18; H04W 48/16; H04W 16/14; H04W 76/30; H04W 84/12; H04W 36/30; H04W 36/32; H04W 36/08; H04L 5/0048
See application file for complete search history.

(56) References Cited

U.S. PATENT DOCUMENTS

| | | | |
|---|---|---|---|
| 6,356,755 B1 * | 3/2002 | Valentine | H04W 60/00 455/434 |
| 8,625,537 B1 | 1/2014 | Sigg et al. | |

(Continued)

OTHER PUBLICATIONS arubanetworks.com "How Does Handoff Assist Work?", Jul. 6, 2014, 4 pages, [Accessed Online Sep. 24, 2018] https://community.arubanetworks.com/t5/Controller-Based-WLANs/How-Does-Handoff-Assist-Work/ta-p/181914.

(Continued)

*Primary Examiner* — Marcos L Torres
(74) *Attorney, Agent, or Firm* — Patterson + Sheridan, LLP (57) ABSTRACT

Embodiments for selective optimized roaming include receiving an indication that a connected device is at a cell edge of a first network. When an alternate access point cannot provide an alternate connection for the connected device, connections to other networks are assessed. This assessment includes receiving radio frequency (RF) signals for a second network and determining, from received RF signals, that the second network provides a better network connection. When the second network can provide a better network connection the connection to the first network is terminated.

20 Claims, 8 Drawing Sheets

(51) Int. Cl.
  *H04W 48/18* (2009.01)
  *H04W 48/16* (2009.01)
  *H04W 16/14* (2009.01)
  H04W 76/30 (2018.01)
  H04W 84/12 (2009.01)

(52) U.S. Cl.
  CPC ............ *H04W 76/12* (2018.02); *H04W 76/30* (2018.02); *H04W 84/12* (2013.01)

(56) References Cited

U.S. PATENT DOCUMENTS

| | | | |
|---|---|---|---|
| 2004/0121774 A1* | 6/2004 | Rajkotia | H04W 36/32 455/441 |
| 2012/0039214 A1* | 2/2012 | Kim | H04L 41/08 370/254 |
| 2014/0307707 A1 | 10/2014 | Mestanov et al. | |
| 2014/0349657 A1* | 11/2014 | Choi | H04W 36/0022 455/437 |
| 2016/0183131 A1 | 6/2016 | Khawer et al. | |
| 2016/0219487 A1 | 7/2016 | Khawer et al. | |
| 2016/0316407 A1* | 10/2016 | Breuer | H04W 36/24 |
| 2017/0303188 A1* | 10/2017 | Fitch | H04W 48/20 |

OTHER PUBLICATIONS

U.S. Appl. No. 16/136,098 "Device Aware Selective Roaming For Mobile Devices," filed Sep. 19, 2018. U.S. Pat. No. 10,455,462.

* cited by examiner

DEVICE AWARE SELECTIVE ROAMING FOR MOBILE DEVICES

CROSS-REFERENCE TO RELATED APPLICATIONS

This application is a continuation of co-pending U.S. patent application Ser. No. 16/136,098, filed Sep. 19, 2018. The aforementioned related patent application is herein incorporated by reference in its entirety.

TECHNICAL FIELD

Embodiments presented in this disclosure generally relate to efficient selective optimized roaming for devices with weak radio connections on cell edges of a wireless local area network. More specifically, embodiments disclosed herein relate to disassociating devices with radio connections on cell edges when another wireless network can provide an improved network connection to the device.

BACKGROUND

In wireless local area networks (WLANs), connected devices on the edge of the cell or area covered by the radio of an access point may suffer from connection issues. In many cases, the connected device will not disconnect despite the connection having a poor quality. This can create instances where the device indicates a connection to a WLAN or other connection, but is not able to actually communicate over the connection to the network. This can create problems with the function of the device and user experience interacting with the connected device. These poor quality connections can also cause network performance problems in the WLAN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

Description of Example Embodiments

Overview

One embodiment presented in this disclosure is a method for selective optimized roaming. The method includes receiving, at a network controller of a first network and via a first network connection, an indication that a connected device is at a cell edge of a first access point of the first network and upon determining, at the network controller, that a second access point of the first network is unable to provide an alternate first network connection for the connected device, the method continues by receiving, from an antenna array, radio frequency (RF) signals for a second network, and determining, from received RF signals, that the second network can provide a second network connection for the connected device. The method also includes, upon determining that the second network can provide the second network connection, transmitting a first network disassociation signal to the connected device which terminates the first network connection.

Another embodiment presented in this disclosure is a system for selective optimized roaming. The system includes a processor and a memory comprising instructions which, when executed on the processor, performs an operation for selective optimized roaming. The operation includes receiving, at a network controller of a first network and via a first network connection, an indication that a connected device is at a cell edge of a first access point of the first network and upon determining, at the network controller, that a second access point of the first network is unable to provide an alternate first network connection for the connected device, the operation continues by receiving, from an antenna array, radio frequency (RF) signals for a second network, and determining, from received RF signals, that the second network can provide a second network connection for the connected device. The operation also includes, upon determining that the second network can provide the second network connection, transmitting a first network disassociation signal to the connected device which terminates the first network connection.

Another embodiment presented in this disclosure is a computer program product for selective optimized roaming. The computer program product includes a non-transitory computer-readable medium program having program instructions embodied therewith, the program instructions executable by a processor to perform an operation. The operation includes receiving, at a network controller of a first network and via a first network connection, an indication that a connected device is at a cell edge of a first access point of the first network and upon determining, at the network controller, that a second access point of the first network is unable to provide an alternate first network connection for the connected device, the operation continues by receiving, from an antenna array, radio frequency (RF) signals for a second network, and determining, from received RF signals, that the second network can provide a second network connection for the connected device. The operation also includes, upon determining that the second network can provide the second network connection, transmitting a first network disassociation signal to the connected device which terminates the first network connection.

Example Embodiments

As described above, in WLANs, connected devices on the edge of the cell or area covered by the radio of a controller suffer from network connection issues. These devices are commonly referred to as sticky clients since they may stick with or keep the connection to a network despite a poor connection. In many cases these sticky clients can drive down overall cell performance by communicating with lower data rates due to a weaker radio uplink/downlink. Some solutions exist to address sticky clients under certain access point connection schemes. In some examples, the solutions attempt to smoothly transition a sticky client to other network connections using, e.g., Optimized Roaming, Low received signal strength indication (RSSI) Check, etc., or, instead, drop or ignore the sticky clients connections using, e.g., direct deauthorization, Receiver Start of Packet (RxSOP), Increasing Mandatory Data Rate, etc.

Optimized Roaming, along with other similar solutions, addresses sticky clients in a network by either steering the sticky clients to a nearby cells (via 11v Basic Service Set (BSS) transition) or de-authenticating the sticky clients with a hope that the clients re-associate to nearby Wi-Fi cell or move to an unlicensed long term evolution (LTE) (unlicensed LTE) such as LTE unlicensed (LTE-U), licensed assisted access (LAA), and/or MulteFire cell networks. However, there are many limitations with these solutions. First, while the aforementioned solutions steer clients based on uplink and/or downlink quality evaluation (low RSSI, signal to noise ratio (SNR), data rate, etc.), the approach taken is usually one-size-fits-all, and are Wi-Fi centric only in the understanding of network connection available to clients. Furthermore, there is little visibility or consideration of different types of clients and their connection abilities at the network controller. For example, an LTE capable mobile phone may be able to leverage a connection to LTE when Wi-Fi is unusable, whereas a typical laptop device must continue to use the poor connection as there is no alternative connection, such as no alternative uplink or downlink connection.

Additionally, these solutions are unaware of presence of nearby unlicensed LTE LTE-U/LAA/MulteFire cells. A mobile phone sticky client can be steered more aggressively and accurately when information about an LTE connection at the mobile phone and its proximity is available. Embodiments described herein provide a graceful manner to transition from one network type to another network type (e.g., Wi-Fi to LTE) for capable devices (e.g., LTE enabled devices).

Figure 1:
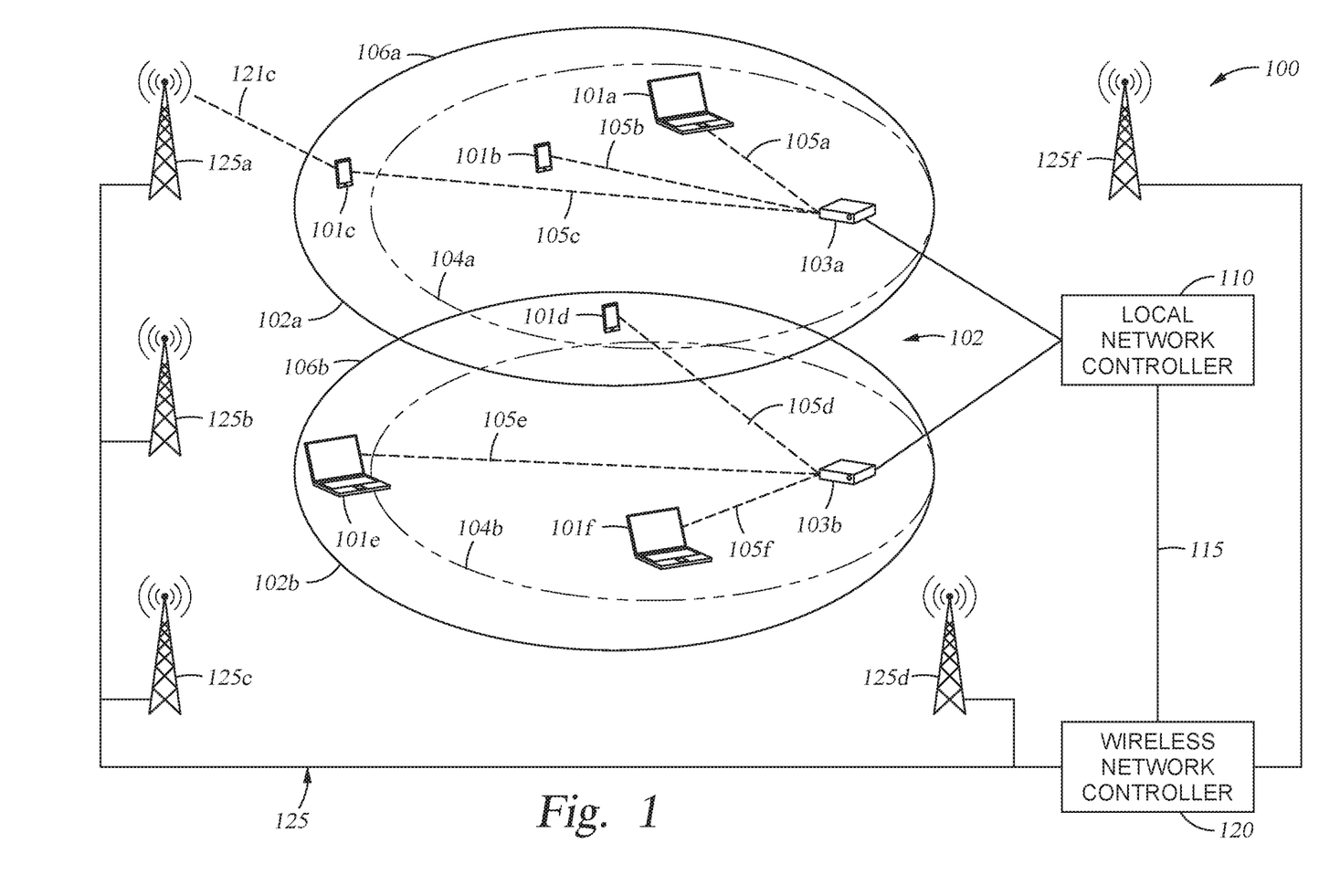
FIG. 1 illustrates a first and second network with connected devices, according to one embodiment.

Turning now to FIG. 1, which illustrates a first and second network with connected devices. As shown, network system 100 includes a first network WLAN 102 including cells 102a and 102b, where device within the cells 102a and 102b can obtain and/or are connected to access points (APs) of the WLAN 102. For example, radio components of AP 103a provide device connection within cell 102a and radio components of AP 103b can provide device connections within cell 102b. The WLAN 102, including any connected APs, is controlled and maintained by local network controller (LNC) 110.

As also shown, multiple user devices and/or clients may be connected to the WLAN 102 through the various access points. The user devices include devices connected to WLAN 102 through AP 103a, such as user device 101a connected through connection 105a to AP 103a, user device 101b connected through connection 105b to AP 103a, and user device 101c connected through connection 105c to AP 103a. Likewise, the user devices also include devices connected to WLAN 102 through AP 103b, such as user device 101d connected through connection 105d to AP 103b, user device 101e connected through connection 105e to AP 103b, and user device 101f connected through connection 105f to AP 103b. In some instances, the APs 103a and 103b may provide stronger radio connections to the user devices within strong coverage areas 104a and 104b respectively. The areas still covered by cell 102a and 102b, but not within strong coverage areas 104a and 104b are cell edges 106a and 106b, where some user devices may become sticky devices/clients. For example, user devices 101c, 101e, and 101d may be sticky devices since they are maintaining a connection to their respective APs despite not being in a strong coverage area.

The sticky devices (user devices 101c, 101d, and 101e) can thus cause network performance to decline in WLAN 102. In some examples, the sticky user devices may be steered to another, better connection within WLAN 102. For example, user device 101d has a sticky connection to AP 103b in cell edge 106b, but is also within cell 102a. When user device 101d is determined to be a sticky device, LNC 110 may steer user device 101d to connect to AP 103a. However, in some examples, the sticky devices may not be steered to another AP of WLAN 102. For example, both user device 101c and 101e are not within any strong coverage area and thus cannot be steered to another AP of WLAN 102. However, these devices may be able to be steered to a second network such as wireless network 125.

As shown, the wireless network 125 may include radios 125a-125f and may also include wireless network controller (WNC) 120. In some examples, the wireless network 125 may comprise an LTE network and/or an unlicensed LTE network. As described herein, when the LNC 110 receives an indication, via the connection 105c and the AP 103a that a user device 101c is at a cell edge 106a of AP 103a, the LNC 110 determines whether a second access point (e.g., AP 103b) of the first network (WLAN 102) can provide an alternate first network connection for the connected device. In the case of user device 101c, no other AP can provide an alternate network connection. Thus LNC 110 then receives, from an antenna array (e.g., an antenna array which receives unlicensed LTE signals) at AP 103a (and/or AP 103b) radio frequency (RF) signals from network 125. As described further herein, LNC 110 then determines, from the received RF signals, whether wireless network 125 can provide a second network connection for the user device 101c (e.g., through wireless connection 121c). When wireless network 125 can provide a network connection (i.e. wireless connection 121c has the properties to provide a connection to user device 101c), LNC 110 transmits a network disassociation signal to the user device 101c which terminates the first network connection. User device 101c then utilizes its wireless connection 121c to wireless network 125, instead of relying on network connection 105c. This provides for a better network connection for user device 101c and also improves the performance of WLAN 102.

In some examples, LNC 110 may also prevent the user device 101c from reconnecting to the WLAN 102 during a back-off window to prevent the sticky device from reconnecting in cell edge 106a. LNC 110 may also validate wireless connection 121c prior or subsequent to disassociating user device 101c. To accomplish this LNC 110 may establish a network tunnel 115 between LNC 110 and WNC 120 and query WNC 120 to confirm the connection 121c. The confirmation may include a registration of the connected device to the wireless network 125 and an indication/confirmation of a downlink connection from the connected device to wireless network 125. WNC 120 may then transmit the confirmation to LNC 110.

Figure 2:
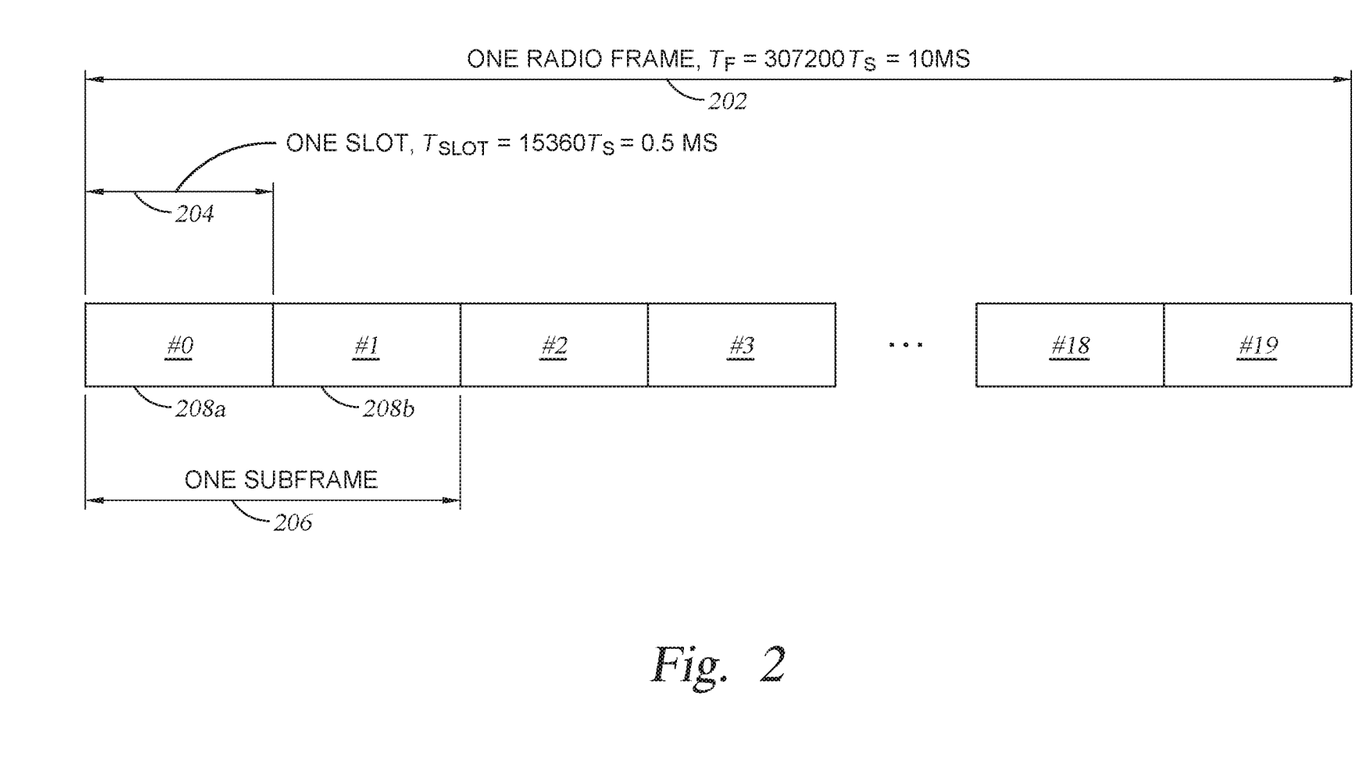
FIG. 2 illustrates a radio frame, according to one embodiment.
Figure 3:
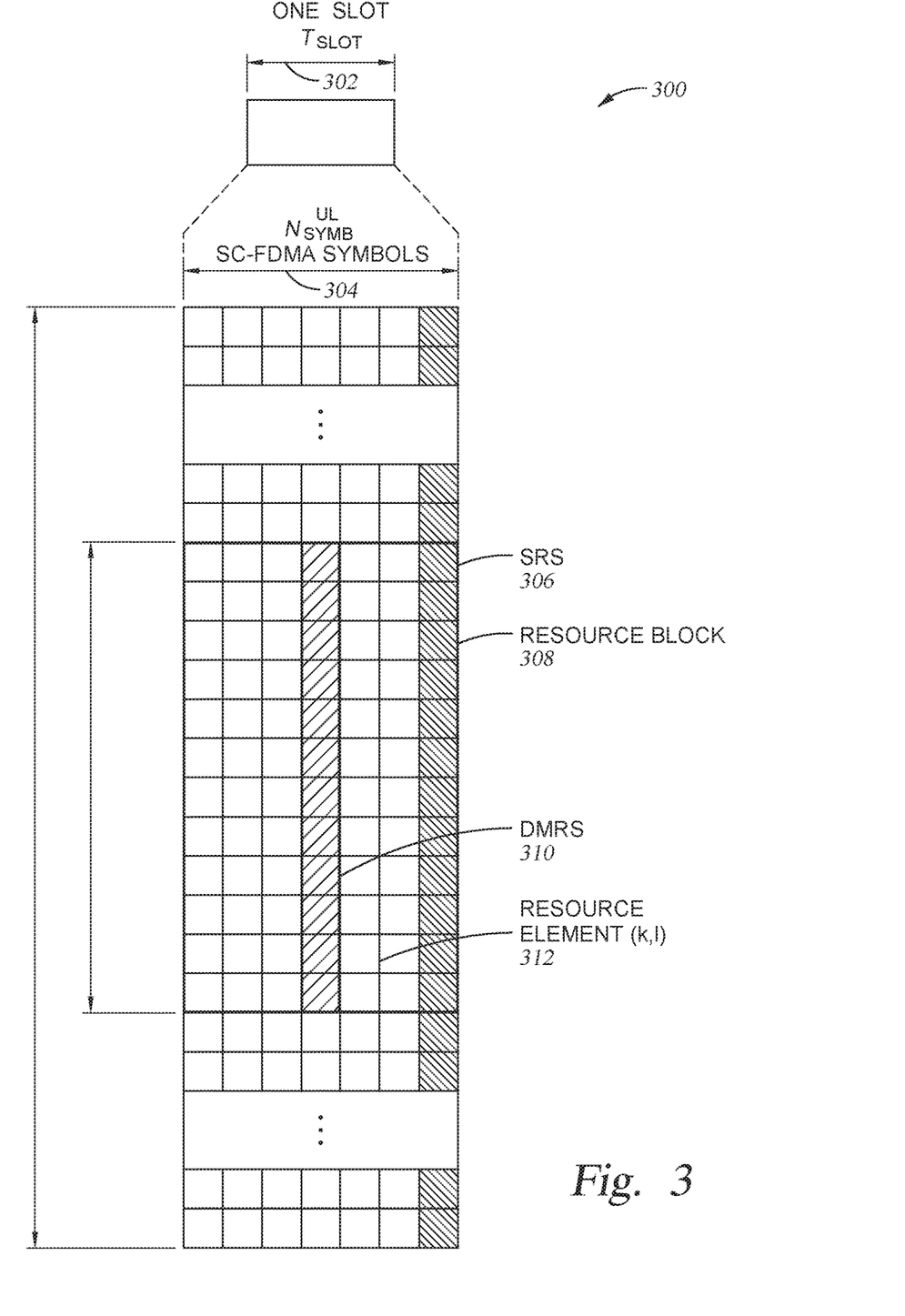
FIG. 3 illustrates a resource grid, according to one embodiment.

In order to determine whether user device 101c has a connection and whether the connection can be utilized instead of the connection to WLAN 102, LNC 110 must snoop the radio signals transmitted between user device 101c and wireless network 125. LNC 110 and/or the connected APs, AP 103a, and 103b may include a radio array that receives unlicensed LTE radio frames, such as the radio frame shown in FIG. 2. In some examples, the radio frame may be an uplink radio frame or a downlink radio frame. As shown, the radio frame 202 may include subframes such as subframe 206. The subframes may further include downlink slots such as time slot 208a and time slot 208b of subframe 206. The downlink slots also include resource elements (such as resource element 312) in a downlink resource grid 304 as shown in FIG. 3. Within the downlink grid 304 is further information about the downlink connection which is organized and stored in the resource elements. For example, column 306 illustrates the resources dedicated to the sounding reference signal (SRS) in the downlink slot. Further, column 310 illustrates resources dedicated to a demodulation reference signal (DMRS). The information gathered from the resource blocks shown may be used to determine various properties of the connection between a user device and the wireless network (e.g., wireless connection 121c), as described herein.

Figure 4:
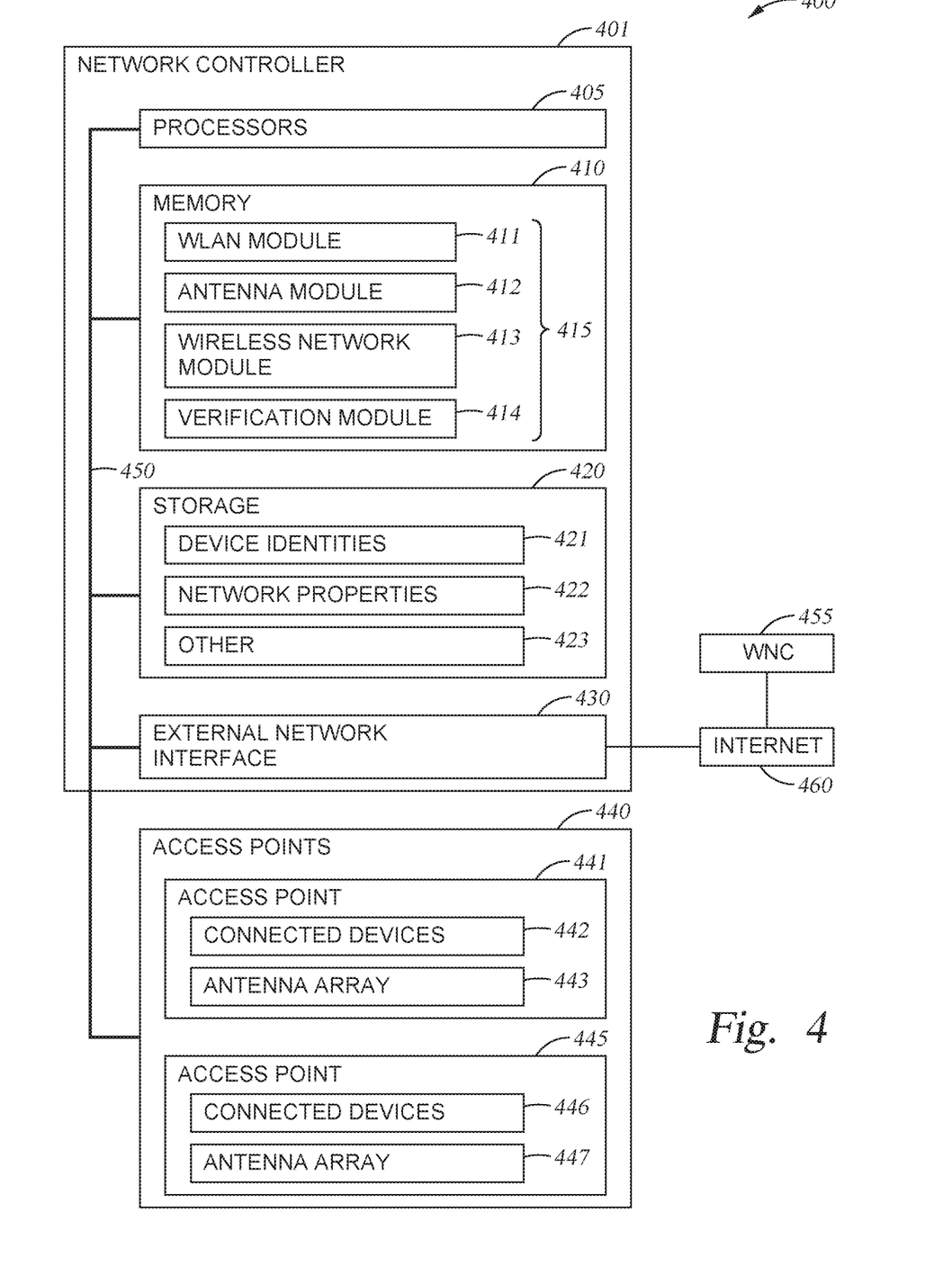
FIG. 4 is a block diagram of a network controller to provide for selective optimized roaming, according to one embodiment.

FIG. 4 illustrates a block diagram of a network controller to provide selective optimized roaming between multiple networks according to one embodiment. As shown in FIG. 4, the arrangement 400 may include a network controller embodied as server/computer/router or network controller 401 executes the function of the LNC 110 and perform the methods described herein. The network controller 401 is shown in the form of a general-purpose computing device. The components of network controller 401 may include, but are not limited to, one or more processors or processing units 405, a system memory 410, a storage system 420, external network interface 430, and a bus 450 that couples various system components including the system memory 410 and storage system 420 to processors 405 along with the external network interface 430 and various access points 440. The access points 440, including AP 441 and AP 445 provide wireless connections to connected devices, such as connected devices 442 and connected devices 446. APs 441 and 445 also include antenna arrays 443 and 447 that snoop properties LTE signals. In other embodiments, arrangement 400 is distributed and includes a plurality of discrete computing devices that are connected through wired or wireless networking.

Bus 450 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Network controller 401 typically includes a variety of computer system readable media. Such media may be any available media that is accessible by network controller 401, and it includes both volatile and non-volatile media, removable and non-removable media.

System memory 410 can include computer system readable media in the form of volatile memory, such as random access memory (RAM) and/or cache memory. Network controller 401 may further include other removable/non-removable, volatile/non-volatile computer system storage media. In some examples, storage system 420 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 450 by one or more data media interfaces. As further depicted and described below, memory 410 may include at least one program product having a set (e.g., at least one) of program modules 415 that are configured to carry out the functions of embodiments of the invention. Network controller 401 may further include other removable/non-removable volatile/non-volatile computer system storage media. In some examples, storage system 420 may be included as part of memory 410 and may typically provide a non-volatile memory for the networked computing devices, and may include one or more different storage elements such as Flash memory, a hard disk drive, a solid state drive, an optical storage device, and/or a magnetic storage device. Storage system 420 may include media for storing device identities 421, network properties 422, and other information 423. The information stored in storage system 420 may be updated and accessed by the program modules 415 described herein.

Memory 410 may include a plurality of program modules 415 for performing various functions related to selective optimized roaming in a WLAN described herein. The modules 415 generally include program code that is executable by one or more of the processors 405. As shown, modules 415 include WLAN module 411, Antenna module 412, Wireless Network module 413, and verification module 414.

The modules 415 may also interact with each other and storage system 420 to perform certain functions. For example, the WLAN module 411 performs process related to functioning of a first network, such as WLAN 102, including receiving, via a first network connection through an access point and a connected device, an indication that the connected device is at a cell edge of a first access point of the first network. For example, WLAN module 411 receives an indication from AP 441 that a connected device of connected devices 442 (e.g., user device 101c) is at a cell edge (i.e., in the cell edge 106a indicating the user device 101c is a sticky device). In some examples, this indication that the connected device is at a cell edge can include an indication from an AP, such as AP 441 that the connected device, such as user device 101c is connected to the AP with a lower RSSI. In some examples, the indication can also include an indication from the AP that the connected device is communicating with the AP with a low modulation and/or a low coding rate. In some examples, the indication can include an indication of unacknowledged packets sent between the AP and the connected device at the cell (e.g., the connected device is not acknowledging some packets sent by the AP). In some examples, the network controller 401 may also include system defaults and/or user configurations which are used to determine when a connected device is operating at a cell edge.

The WLAN module 411 then determines, using network properties 422 and interacting with other connect access points such as AP 445, whether a second access point of the first network can provide an alternate first network connection for the connected device. For example, WLAN module 411 determines whether AP 445 embodied as AP 103a can provide another/alternate connection the WLAN 102. whether the second access point can provide an alternate first network connection, the WLAN module 411 redirects the first network connection to the second access point. For example, when user device 101d is in the cell edge 106b of AP 103b, WLAN module 411 redirects connection 105d from AP 103b to AP 103a. In some examples, the WLAN module 411 redirects the connected device by steering the connection using 802.11v BSS transition management frame to another access point.

In another example, when the second access point cannot provide the alternate first network connection for the connected device such as in the case of user device 101c, further processes continue as described herein. In some examples, upon a determination that a second network can provide a second network connection, the WLAN module 411 transmits a first network disassociation signal to the connected device which terminates the first network connection. For example, LNC 110 transmits a disassociation signal to user device 101c when connection 121c is confirmed. In some examples, WLAN module 411 also prevents the connected device from reconnecting to the first network during a back-off window by association denial and probe suppression from the now disassociated device.

As shown in FIG. 1, the program modules 415 also include the antenna module 412 which receives, from an antenna array, radio frequency (RF) signals for a second network. For example, antenna module 412 receives RF signals from antenna array 443 of the AP 441. In some examples, these RF signals are radio signals associated with an unlicensed LTE network and a connected device. For example, an antenna array on AP 103a may snoop the unlicensed LTE signals between user device 101c and the network 125, such as the signals transmitted between radio 125a and user device 101c via connection 121c. The snooped signals are then transmitted back to and received by LNC 110 and antenna module 412 operating on the network controller.

In turn, the wireless network module 413, determines, from received RF signals, whether the second network (e.g., wireless network 125) can provide a second network connection for the connected device. In some examples, the wireless network module 413 determines, from the received RF signals, whether the second network can provide the second network connection for the connected device by determining a device identity for the connected device and determining, from a device identity database, whether the device identity indicates the device can connect to the second network. In some examples, determining the device identity may comprise using known methods for device fingerprinting on a Wi-Fi network such as Vendor Organizationally Unique identifiers (OUI), Dynamic Host Configuration Protocol (DHCP) Request Snooping (Option 55 and Option 60), and various RF Fingerprinting techniques. For example, the wireless network module may utilize device identities 421 and or query an external device identity database via external network interface 430 to determine that the connected device can connect to a second network, such as an unlicensed LTE network. For example, as shown in FIG. 1, user device 101c comprises a mobile device, such as a mobile phone, which is able to connect to the unlicensed LTE network. The device identification of user device 101c can be used by LNC 110 to determine that it is a mobile device with unlicensed LTE connection capabilities. In contrast, user device 101e, may comprise a personal computer that does not have method (such as an unlicensed LTE radio) to connect to the unlicensed LTE network. In this instance, the connection to the network is honored or continued to prevent association starvation.

When the device can connect to the second network, e.g., wireless network 125, wireless network module 413 then identifies, from the RF signals, network properties of the second network and determines from the identified network properties that the second network can provide the second network connection for the connected device. For example, wireless network module 413 determines whether wireless network 125 can provide a sufficient connection to user device 101c through connection 121c. For example, wireless network module 413 may determine that the unlicensed LTE network, wireless network 125, comprises a waveform within a connectable proximity to the connected device, user device 101c. In some examples, wireless network module 413 determines a proxy SNR for the unlicensed LTE network. The proxy SNR is used by the network module 413 to determine a quality of the waveform (connection) to the unlicensed LTE network in comparison to the SNR or quality of connection to WLAN 102. In some examples, the wireless network module 413 may include a buffer/padding level when the proxy SNR and the SNR are both indicative of a poor quality connection to avoid looping between the first and second networks.

In some examples, such as when wireless network 125 is an unlicensed LTE network, wireless network module 413 identifies, from the RF signals, network properties of the second network by determining one or more angle of arrival (AoA) values for an LTE cell of the unlicensed LTE. In some examples, the AoA values are estimated based on properties of unlicensed LTE signals that overlap with Wi-Fi frequency signals and received by the antenna arrays, such as antenna arrays 443 and 447. The proxy SNR of the unlicensed LTE signals can also be observed by the antenna arrays 443 and 447. In some examples, combining the proxy SNR and the AoA can be used to estimate the directionality and intensity of unlicensed LTE signals. For example, antenna arrays 443 and 447 may include linear or circular array antennas. The network module 413 may then use a phased difference between the signals received at each antennae of the antenna array to determine the AoA using a known distance between the antennas. In some examples, the calculated AoA for each of the connected devices may be cached and/or stored in network properties 422. In some examples, AoAs are calculated for each radio 125b-125f that can provide cells covering the connected device, user device 101c, such that each downlink signal that may be transmitted from user device 101c is measured for an AoA value.

In some examples in order to calculate the AoA, the wireless network module 413, first determines, from the RF signals an LTE primary synchronization signal and an LTE secondary synchronization signal for the LTE cell. For example, the wireless network module 413 determines the LTE primary synchronization signal and the LTE secondary synchronization signal from a radio frame (such as frame 202) in the RF signals. For example, the wireless network module 413 can determine the LTE primary and secondary synchronization signals for the LTE cell for network 125 provided by radio 125a. Wireless network module 413 then determines, from the LTE primary synchronization signal and the LTE secondary synchronization signal a cell identification for the LTE cell (IDCell). In some examples, a secondary shared channel (SCH) is known to the wireless network module 413 relative to a primary SCH. In this example, there are 168 different IDcells and there are 2 sub-frames (i.e., secondary SCH is different in first and second subframe) resulting in 336 cross correlations calculated for each subframe. In some examples, this cross correlation has only 62 non-zero values and the values are either 1 or −1. Based on the correlation results, the exact frame boundary (first or second subframe) and IDcell is found.

Wireless network module 413 also determines a frame format of the LTE cell, for example, the wireless network modules 413 may determine the frame format of the downlink radio frame 202. In some examples, the wireless network module 413 determines the frame format (type) based on the location of primary synchronization and secondary synchronization signal in relation to each other. In some examples, the frame format of the downlink radio frame 202 may be arbitrary when received at the network module. The determined format thus enables wireless network module 413 to decode a master information block and a physical broadcast channel of the LTE cell using the determined frame format and primary and secondary synchronization signals. For example, the master information block may be in the physical broadcast channel (PBCH), which is known in the radio frame. For example, the wireless network module 413 may decode the downlink resource grid as shown in FIG. 3. Wireless network module 413 then determines a location, within the decoded resource grid 300, of a downlink demodulation reference signal (e.g., column 310 in FIG. 3) and sounding reference signal (e.g., column 306) using the decoded master information block and physical broadcast channel. The wireless network module 413 may also store all of the determined information described above in network properties 422 for later use. In some examples, wireless network module 413 also calculates the one or more AoA values using the downlink demodulation reference signal and sounding reference signal. In some examples, the RSSI of an LTE signal corresponds to the distance from the AP.

In some examples, the wireless network module 413 may also filter redundant AoA values. For example, multiple calculations of the AoA for various resource blocks may result in the same or similar AoA values. In some examples, these redundant values may be filtered to avoid unnecessary storage of redundant values. For example, signals with similar AoAs may be treated as one source. In another example, redundant AoA values may be aggregated to use larger resource blocks to obtain a more accurate AoA. For example, the wireless network module 413 may receive signals from one or more subcarriers and utilize information from the multiple signals to calculate the AoAs.

The program modules 415 also include verification module 414. In some examples, verification module 414 validates the second network connection by establishing a network tunnel between the network controller and a second network controller using external network interface 430. For example as shown in FIG. 1, LNC 110 establishes network tunnel 115 between the LNC 110 and WNC 120. In some examples, LNC 110 and WNC 120 may be controlled by a single entity such that a network tunnel is not needed for LNC 110 and WNC 120 to communicate. Verification module 414 then queries the second network controller (e.g., WNC 455 embodied as WNC 120) to confirm the second network connection (e.g., connection 121c between wireless network 125 and user device 101c). In some examples, a confirmed second network connection comprises a registration of the connected device to the second network and a downlink connection from the connected device to the second network. Upon verification of the connection properties the second network controller (WNC 120) transmits a confirmation back to LNC 110. Verification module 414 then receives a confirmation from the second network controller of the second network connection. In some examples, the second network controller, WNC 120, may query the connected device, user device 101c, to confirm the registration and active downlink connection. In another example, the validation of the second network connection may be determined from a payload of the RF signals. In another example, the LNC 110 and WNC 120 may coordinate to determine which network provides the best connection for the connected device using a Wi-Fi signal strength and unlicensed LTE signal strength. In some examples, the validation of the second network connection occurs before the first network disassociation signal is transmitted to the connected device.

Figure 5:
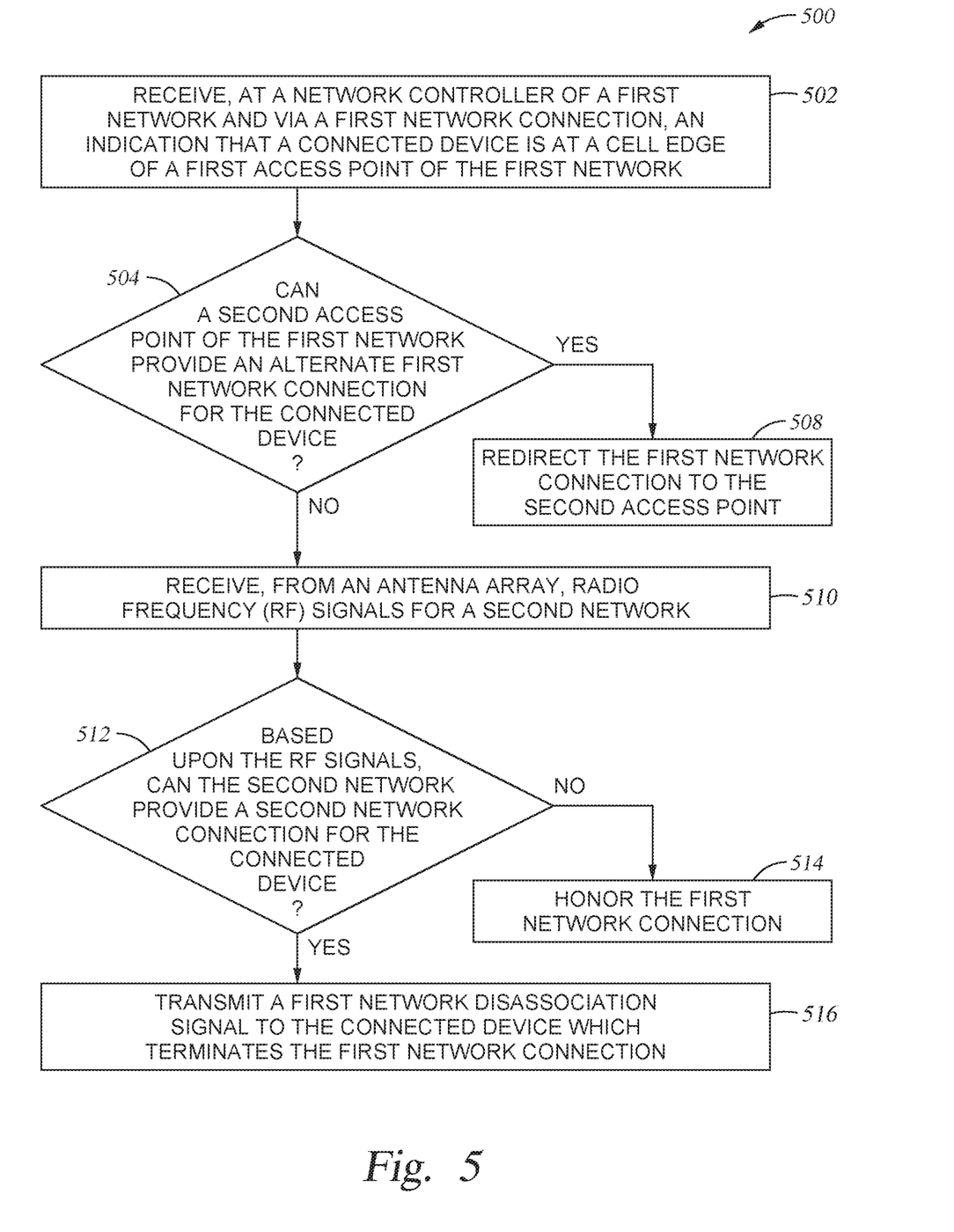
FIG. 5 is a method for selective optimized roaming, according to one embodiment.

FIG. 5 illustrates a method for selective optimized roaming, according to one embodiment. Method 500 begins at block 502 where a network controller of a first network, such as LNC 110 of WLAN 102, receives, via a first network connection (connection 105c), an indication that a connected device (user device 101c) is at a cell edge of a first access point (AP 103a) of the first network (WLAN 102). At block query 504, the network controller (LNC 110) determines whether a second access point (AP 103b) of the first network (WLAN 102) can provide an alternate first network connection for the connected device (user device 101c).

When the second access point can provide the alternate first network connection, method 500 continues to block 508 where network controller (LNC 110) redirects the first network connection to the second access point. For example, for the user device 101d as shown in FIG. 1, LNC may direct the connection from AP 103b to AP 103a.

When the second access point cannot provide the alternate first network connection, method 500 continues to block 510 where the network controller (LNC 110) receives radio frequency (RF) signals for a second network (wireless network 125). In some examples, the RF signals are received at the network controller via an antenna array at one or more of the connected APs (AP 103a and 103b).

Method 500 continues at query block 512 where the network controller (LNC 110) determines, from received RF signals, whether the second network (wireless network 125) can provide a second network connection (connection 121c) for the connected device (user device 101c). When the second network cannot provide the second network connection for the connected device, method 500 proceeds to block 514, where the first network connection is honored, even if the connection is sticky.

When the second network can provide the second network connection for the connected device, method 500 proceeds to block 516 where the network controller (LNC) transmits a first network disassociation signal to the connected device (user device 101c) which terminates the first network connection (connection 105c).

Figure 6:
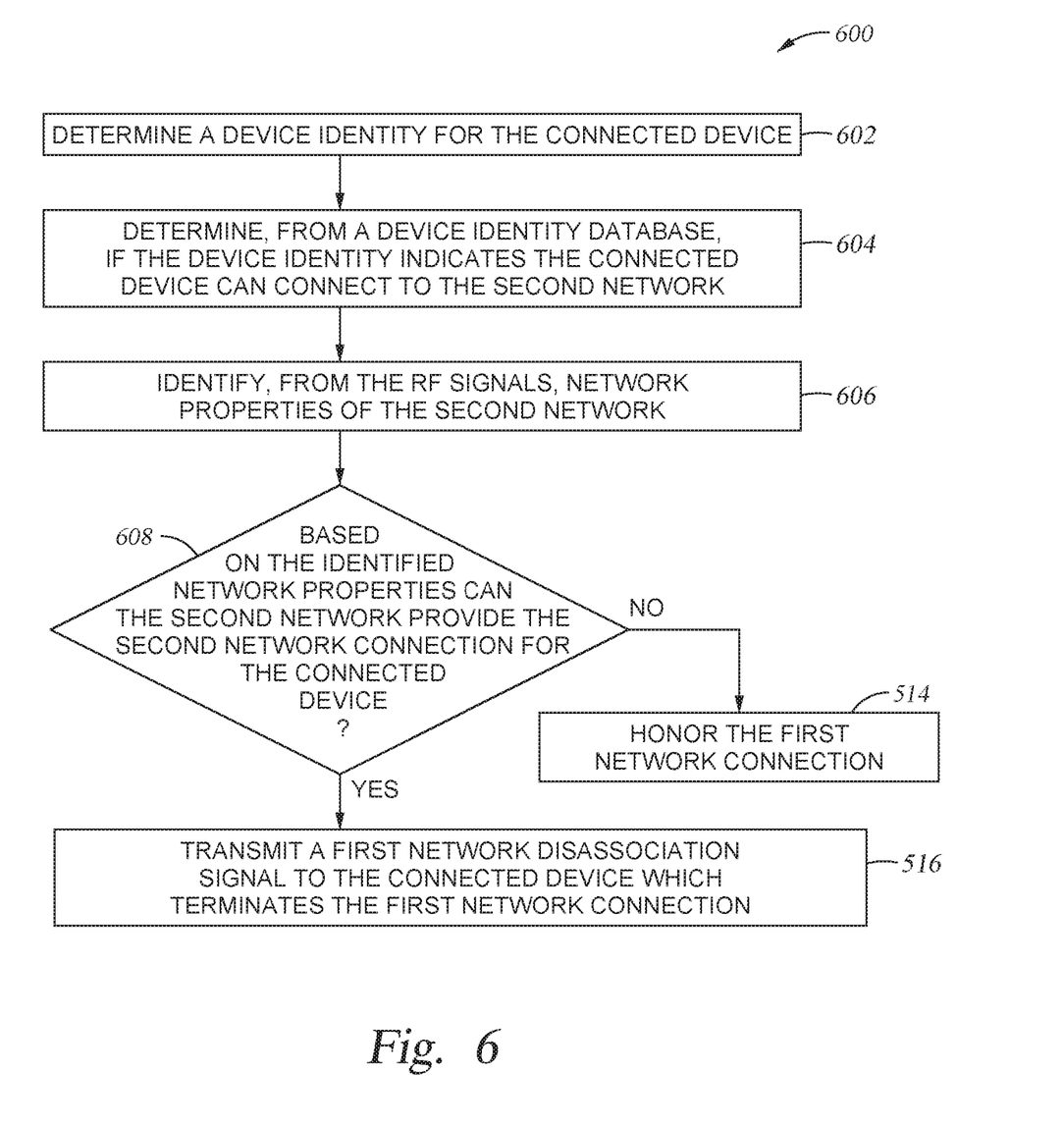
FIGS. 6-8 are methods for selective optimized roaming, according to various embodiments.

FIG. 6 illustrates an additional method for selective optimized roaming, according to one embodiment. Method 600 begins at block 602 where a network controller (LNC 110) determines a device identity for the connected device (user device 101c). At block 604, the network controller (LNC 110) determines, from a device identity database, that the device identity indicates the connected device can connect to the second network (wireless network 125).

Method 600 continues at block 606, where the network controller (LNC 110) identifies, from the RF signals, network properties of the second network (wireless network 125). At query block 608, the network controller (LNC 110) determines from the identified network properties that the second network can provide the second network connection for the connected device. When the second network can provide the second network connection, the method returns to block 516 of FIG. 5. When the second network cannot provide the second network connection, the method returns to block 514 of FIG. 5.

Figure 7:
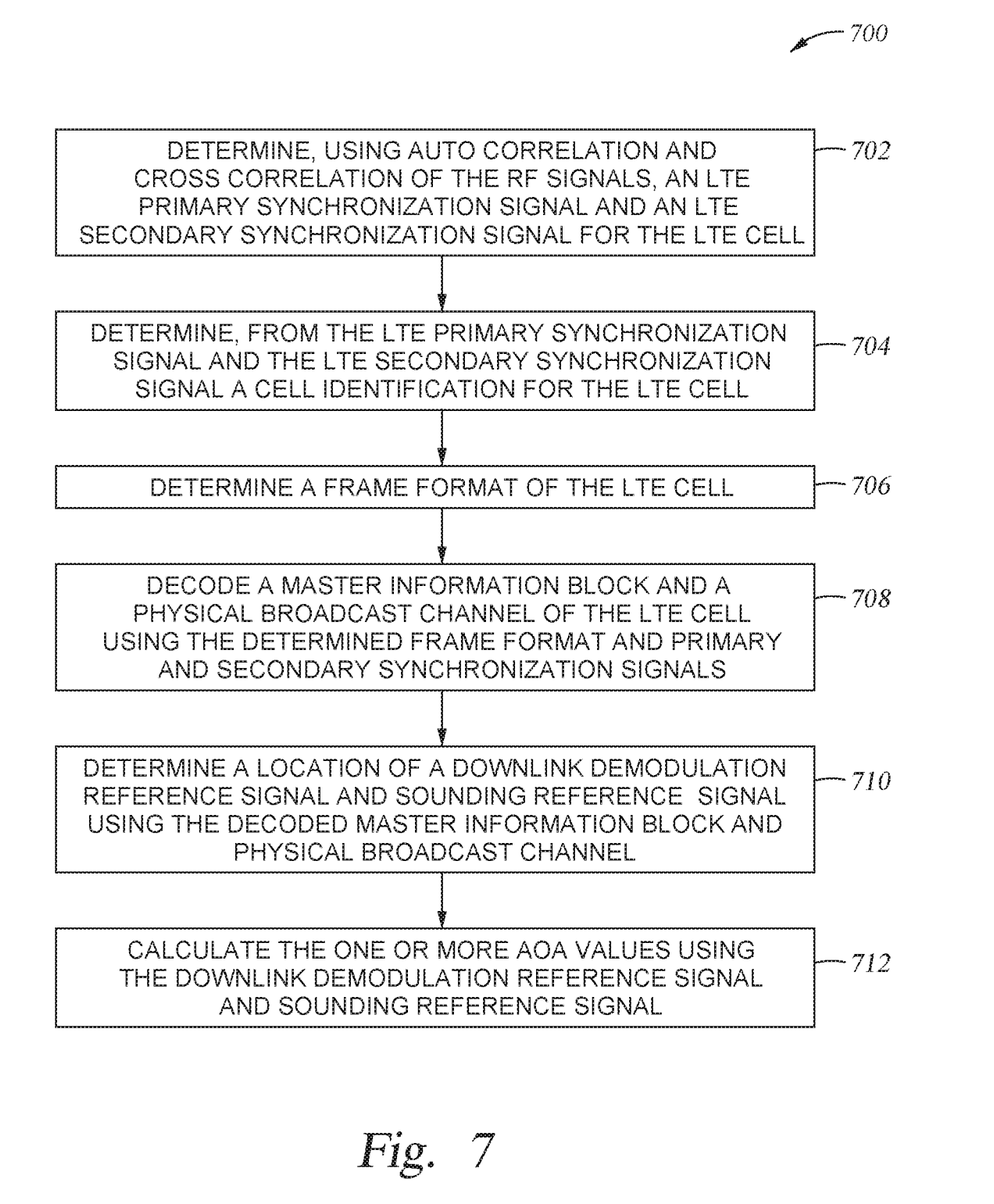

FIG. 7 illustrates an additional method for selective optimized roaming, according to one embodiment, including determining one or more angle of arrival (AoA) values for an LTE cell of the unlicensed LTE network by. Method 700 begins at block 702 where a network controller (LNC 110) determines, using auto correlation and cross correlation of the RF signals, an LTE primary synchronization signal and an LTE secondary synchronization signal for the LTE cell. At block 704, the network controller (LNC 110) determines, from the LTE primary synchronization signal and the LTE secondary synchronization signal a cell identification for the LTE cell.

Method 700 continues at block 706 and 708, where the network controller (LNC 110) determines a frame format of the LTE cell and decodes a master information block and a physical broadcast channel of the LTE cell using the determined frame format and primary and secondary synchronization signals. At block 710, the network controller (LNC 110) determines a location of a downlink demodulation reference signal and sounding reference signal using the decoded master information block and physical broadcast channel. Method 700 then continues at block 712 where network controller (LNC 110) calculates the one or more AoA values using the downlink demodulation reference signal and sounding reference signal.

Figure 8:
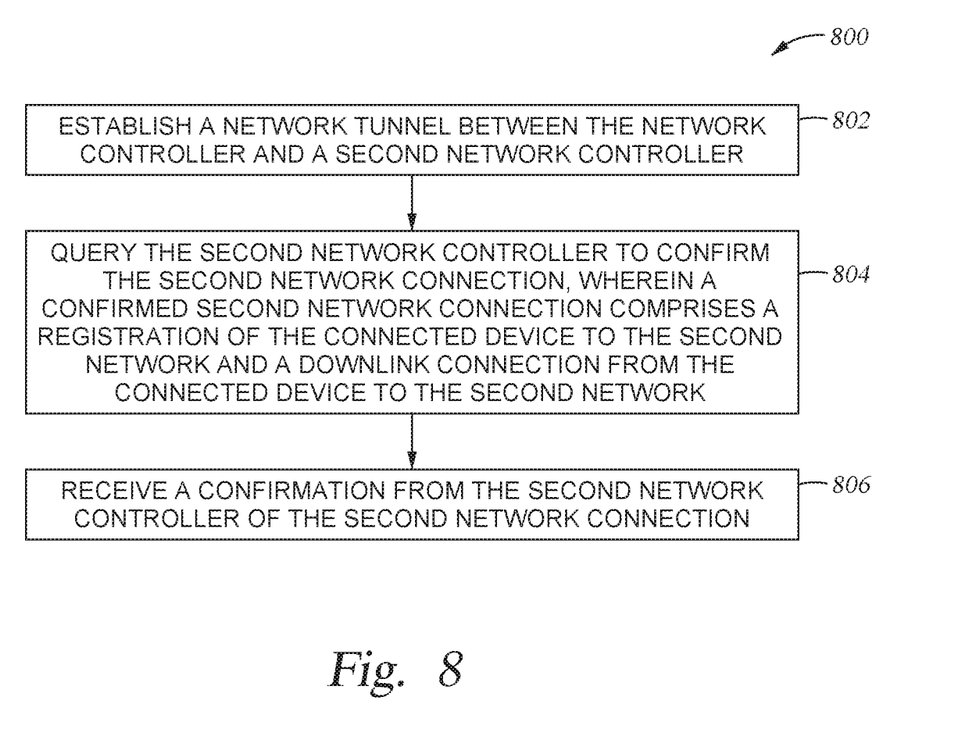

FIG. 8 illustrates an additional method for selective optimized roaming, according to one embodiment, including validating a second network connection. Method 800 begins at block 802 where a network controller (LNC 110) establishes a network tunnel (network tunnel 115) between the network controller (LNC 110) and a second network controller (WNC 120).

At block 804, the network controller (LNC 110) queries the second network controller (WNC 120) to confirm the second network connection (connection 121c). The confirmed second network connection comprises a registration of the connected device to the second network and a downlink connection from the connected device to the second network. Method 800 continues at block 806, where the network controller (LNC 110) receives a confirmation from the second network controller (WNC 120) of the second network connection (wireless network connection 121c).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, at a network controller of a first network and via a first network connection, an indication that a connected device is at a cell edge of the first network;
determining, at the network controller and from radio frequency (RF) signals for a second network received at an antenna array, one or more network properties for the second network, wherein the antenna array is located at an access point of the first network, wherein the RF signals comprise at least RF signals transmitted between the connected device and the second network;
determining based on the one or more network properties, that the second network can provide a second network connection for the connected device; and
transmitting a first network disassociation signal to the connected device which terminates the first network connection.

2. The method of claim 1, further comprising:
determining a device identity for the connected device;
determining, from a device identity database, that the device identity indicates the connected device can connect to the second network;
identifying, from the RF signals, network properties of the second network; and
determining from the identified network properties that the second network can provide the second network connection for the connected device.

3. The method of claim 2, wherein the second network is an unlicensed long term evolution (LTE) network and wherein determining from the identified network properties that the second network can provide the second network connection for the connected device further comprises:
determining that the unlicensed LTE network comprises a waveform within a connectable proximity to the connected device.

4. The method of claim 1, further comprising:
preventing the connected device from reconnecting to the first network during a back-off window.

5. The method of claim 1, further comprising:
validating the second network connection by:
establishing a network tunnel between the network controller and a second network controller;
querying the second network controller to confirm the second network connection, wherein a confirmed second network connection comprises a registration of the connected device to the second network and a downlink connection from the connected device to the second network; and
receiving a confirmation from the second network controller of the second network connection.

6. The method of claim 1, further comprising:
determining, at the network controller, that a second access point of the first network is unable to provide an alternate first network connection for the connected device.

7. The method of claim 6, further comprising:
determining the second access point can provide the alternate first network connection for the connected device; and
redirecting the first network connection to the second access point.

8. A system, comprising:
a processor; and
a memory comprising instructions which, when executed on the processor, performs an operation for selective optimized roaming, the operation comprising:
receiving, at a network controller of a first network and via a first network connection, an indication that a connected device is at a cell edge of the first network;
determining, at the network controller and from radio frequency (RF) signals for a second network received at an antenna array, one or more network properties for the second network, wherein the antenna array is located at an access point of the first network, wherein the RF signals comprise at least RF signals transmitted between the connected device and the second network;
determining based on the one or more network properties, that the second network can provide a second network connection for the connected device; and
transmitting a first network disassociation signal to the connected device which terminates the first network connection.

9. The system of claim 8, wherein the operation further comprises:
determining a device identity for the connected device;
determining, from a device identity database, that the device identity indicates the connected device can connect to the second network;
identifying, from the RF signals, network properties of the second network; and
determining from the identified network properties that the second network can provide the second network connection for the connected device.

10. The system of claim 9, wherein the second network is an unlicensed long term evolution (LTE) network and wherein determining from the identified network properties that the second network can provide the second network connection for the connected device further comprises:
determining that the unlicensed LTE network comprises a waveform within a connectable proximity to the connected device.

11. The system of claim 8, wherein the operation further comprises:
preventing the connected device from reconnecting to the first network during a back-off window.

12. The system of claim 8, wherein the operation further comprises:
validating the second network connection by:
establishing a network tunnel between the network controller and a second network controller;
querying the second network controller to confirm the second network connection, wherein a confirmed second network connection comprises a registration of the connected device to the second network and a downlink connection from the connected device to the second network; and
receiving a confirmation from the second network controller of the second network connection.

13. The system of claim 8, wherein the operation further comprises:
determining, at the network controller, that a second access point of the first network is unable to provide an alternate first network connection for the connected device.

14. The system of claim 13, wherein the operation further comprises:
determining the second access point can provide the alternate first network connection for the connected device; and
redirecting the first network connection to the second access point.

15. A computer program product for selective optimized roaming, the computer program product comprising a non-transitory computer-readable tangible storage medium having program instructions embodied therewith, the program instructions executable by a processor to perform an operation comprising:
receiving, at a network controller of a first network and via a first network connection, an indication that a connected device is at a cell edge of the first network;
determining, at the network controller and from radio frequency (RF) signals for a second network received at an antenna array, one or more network properties for the second network, wherein the antenna array is located at an access point of the first network, wherein the RF signals comprise at least RF signals transmitted between the connected device and the second network;
determining based on the one or more network properties, that the second network can provide a second network connection for the connected device; and
transmitting a first network disassociation signal to the connected device which terminates the first network connection.

16. The computer program product of claim 15, wherein the operation further comprises:
determining a device identity for the connected device;
determining, from a device identity database, that the device identity indicates the connected device can connect to the second network;
identifying, from the RF signals, network properties of the second network; and
determining from the identified network properties that the second network can provide the second network connection for the connected device.

17. The computer program product of claim 16, wherein the second network is an unlicensed long term evolution (LTE) network and wherein determining from the identified network properties that the second network can provide the second network connection for the connected device further comprises:
determining that the unlicensed LTE network comprises a waveform within a connectable proximity to the connected device.

18. The computer program product of claim 15, wherein the operation further comprises:
preventing the connected device from reconnecting to the first network during a back-off window.

19. The computer program product of claim 15, wherein the operation further comprises:
validating the second network connection by:
establishing a network tunnel between the network controller and a second network controller;
querying the second network controller to confirm the second network connection, wherein a confirmed second network connection comprises a registration of the connected device to the second network and a downlink connection from the connected device to the second network; and
receiving a confirmation from the second network controller of the second network connection.

20. The computer program product of claim 15, wherein the operation further comprises:

determining, at the network controller, that a second access point of the first network is unable to provide an alternate first network connection for the connected device.

\* \* \* \* \*